US007537186B2

(12) United States Patent
Putre et al.

(10) Patent No.: US 7,537,186 B2
(45) Date of Patent: May 26, 2009

(54) WORK STAND

(75) Inventors: Michael H. Putre, Parma, OH (US); Steven K. Morris, Avon, OH (US); Michael P. Gallagher, Brunswick, OH (US)

(73) Assignee: Emerson Electric Co., St. Louis, MO (US)

( * ) Notice: Subject to any disclaimer, the term of this patent is extended or adjusted under 35 U.S.C. 154(b) by 1009 days.

(21) Appl. No.: 10/921,250

(22) Filed: Aug. 19, 2004

(65) Prior Publication Data

US 2006/0038093 A1 Feb. 23, 2006

(51) Int. Cl.
*F16M 11/00* (2006.01)

(52) U.S. Cl. ........................ 248/169; 248/167; 248/435

(58) Field of Classification Search ................ 248/168, 248/169, 163.1, 434, 435, 167
See application file for complete search history.

(56) References Cited

U.S. PATENT DOCUMENTS

| | | | | | |
|---|---|---|---|---|---|
| 2,282,285 | A | * | 5/1942 | Olson | 248/169 |
| 2,579,348 | A | * | 12/1951 | Taylor | 248/178.1 |
| 2,688,682 | A | * | 9/1954 | Bell | 219/50 |
| 2,831,583 | A | | 4/1958 | Wright et al. | |
| 2,923,190 | A | | 2/1960 | Ingwer et al. | |
| 3,038,690 | A | * | 6/1962 | Alexiou | 248/155.3 |
| 4,324,477 | A | * | 4/1982 | Miyazaki | 248/163.1 |
| 4,453,686 | A | * | 6/1984 | Ina | 248/168 |
| 4,648,697 | A | * | 3/1987 | Kawazoe | 248/163.1 |
| 5,025,715 | A | * | 6/1991 | Sir | 99/421 HV |
| 5,165,665 | A | | 11/1992 | Jolivette, Sr. | |
| 5,297,779 | A | | 3/1994 | Collins et al. | |
| D348,340 | S | | 6/1994 | Collins et al. | |
| 5,934,626 | A | | 8/1999 | Collins | |
| 6,575,422 | B1 | * | 6/2003 | Zheng | 248/436 |
| 6,748,873 | B2 | * | 6/2004 | Brown, Sr. | 108/6 |
| 6,820,844 | B2 | * | 11/2004 | Tiffen et al. | 248/168 |

OTHER PUBLICATIONS

Sumner Manufacturing Co.; photograph of 2002 Catalog page showing the NLV Tri-Stand Pipe Vise.

* cited by examiner

*Primary Examiner*—J. Allen Shriver
*Assistant Examiner*—Steven Marsh
(74) *Attorney, Agent, or Firm*—Rankin, Hill & Clark LLP

(57) ABSTRACT

A work stand comprises a base having top and bottom sides and a tubular support member extending downwardly from said bottom side. Three legs are spaced apart about the support member and have upper ends pivotally attached to the base and lower ends below the support member for engaging an underlying surface to support the base above said surface. A collar is slidable on the tubular support member between upper and lower positions relative to the base, and links between the collar and legs provide for displacing the legs between extended and retracted positions relative to the support member when the collar is moved along the support member. A handle is mounted on the sleeve for displacing the sleeve and thus the legs between the extended and retracted positions thereof and for carrying the stand in the retracted position of the legs. A latch on the base and a keeper provided by the handle interengage in the retracted position of the legs to releasably hold the legs in the retracted position.

19 Claims, 6 Drawing Sheets

WORK STAND

BACKGROUND OF THE INVENTION

This invention relates to the art of work supporting stands and, more particularly, to improvements in a foldable and transportable tripod stand for supporting work pieces such as pipes.

A tripod-type work stand of the character to which the present invention relates in general is shown, for example, in U.S. Pat. No. 2,831,583 to Wright, et al. This stand comprises a base for supporting a vise, and three legs pivotally attached to the base for displacement between extended and retracted positions relative thereto. In the extended positions the legs are in a tripod configuration for supporting the base above an underlying surface, and in the retracted positions the legs are generally parallel to one another to facilitate storage and transportation of the stand. An assembly of pivotally interconnected plates is stored between the legs when the latter are in the retracted positions and, in the extended positions of the legs, the plate assembly places the legs in the latter position and provides a tray for supporting tools and the like.

Another foldable tripod-type vise stand is available from Sumner Manufacturing Company of Houston, Tex. under the latter company's product designation NLV Tri-Stand Pipe Vise. The latter comprises a pipe vise mounted on a base plate to which three legs are mounted for pivotal displacement between retracted and extended positions. A tubular support extends downwardly from the base between the legs and carries a slidable ring which is pivotally interconnected with the legs by link members such that the ring is slidable upwardly and downwardly along the tubular member to respectively displace the legs from the extended to the retracted position and thence back to the extended position. A carrying handle is attached to the tubular member to facilitate carrying the stand when the legs are in the retracted positions thereof.

While stands of the foregoing character serve their intended purpose, there are a number of concerns with regard to the use of the stands. In this respect, for example, physically displacing the legs of the stand between the extended and retracted positions thereof is difficult and cumbersome and, in the retracted positions of the legs, there is no stability against unintended displacement of the legs toward the extended position if, for example, the stand is inclined in the direction promoting displacement of the legs relative to the base and toward the extended positions thereof. Still further, there is excessive free-play as the result of wear and/or an accumulation of manufacturing tolerances between the legs, base and other parts of the stands mentioned above, and the excessive free-play interferes with a smooth displacement of the legs and transition of the component parts of the stand between the extended and retracted positions of the legs.

SUMMARY OF THE INVENTION

In accordance with the present invention, a foldable work stand is provided by which the foregoing and other concerns and disadvantages regarding such stands heretofore available are advantageously minimized or overcome. More particularly in this respect, a stand in accordance with the invention incorporates a carrying handle with the components by which the legs are extendible and retractable relative to the base. Thus, in addition to facilitating the carrying of the stand, the handle also facilitates displacement of the legs between the extended and retracted positions thereof. In accordance with another aspect of the invention, a latching arrangement is provided for releasably holding the legs in the retracted positions thereof, thus eliminating the possibility of the legs unintentionally moving toward the extended positions thereof during storage and transportation of the stand. Still a further aspect of the invention provides an adjustable clamping arrangement between a leg and base of the stand to eliminate free-play between the base and legs to improve stability of the stand during use and to facilitate transition of the legs from the extended to the retracted positions thereof. In accordance with yet another aspect of the invention, the ends of the legs engaging the underlying support surface for the stand are configured and dimensioned to provide improved stability against tipping of the stand during use. Further in accordance with the invention, and as a convenience for the user, the base component is preferably provided with relatively deep notches or recesses extending inwardly from the outer periphery thereof to facilitate supporting tools, such as pipe wrenches, at the height of the base when the stand is erected.

It is accordingly an outstanding object of the present invention to provide an improved tripod-type work supporting stand in which the legs are displaceable between extended positions in which the stand is usable and retracted positions in which the stand is configured for storage and transportation.

Another object is the provision of a stand of the foregoing character having improved stability when the legs are in the extended position and engaging an underlying surface for use of the stand.

A further object is to provide a stand of the foregoing character having improved leg extending and retracting capability and providing improvements in connection with the transportation and storage of the stand.

Yet another object is the provision of a stand of the foregoing character in which displacement of the legs between the extended and retracted positions thereof is easier to achieve than with stands heretofore available.

Still another object is the provision of a stand of the foregoing character in which a handle for carrying the stand is integrated with component parts by which the legs are displaced between the extended and retracted positions thereof, thus to facilitate both transition of the legs between the two positions and transportation and storage of the stand in the collapsed position of the legs.

Yet a further object is the provision of a stand of the foregoing character in which at least one of the legs in the extended positions of the legs is adjustable relative to the base so as to minimize free-play between the component parts of the stand to stabilize the stand during use and to facilitate the transition of the legs from the extended to the retracted position thereof.

A further object is the provision of a stand of the foregoing character in which the base is provided with tool supports to facilitate use of the work stand by a user.

BRIEF DESCRIPTION OF THE DRAWINGS

The foregoing objects, and others, will in part be obvious and in part pointed out more fully hereinafter in conjunction with the written description of a preferred embodiment of the invention illustrated in the accompanying drawings in which.

DESCRIPTION OF A PREFERRED EMBODIMENT

Figure 1:
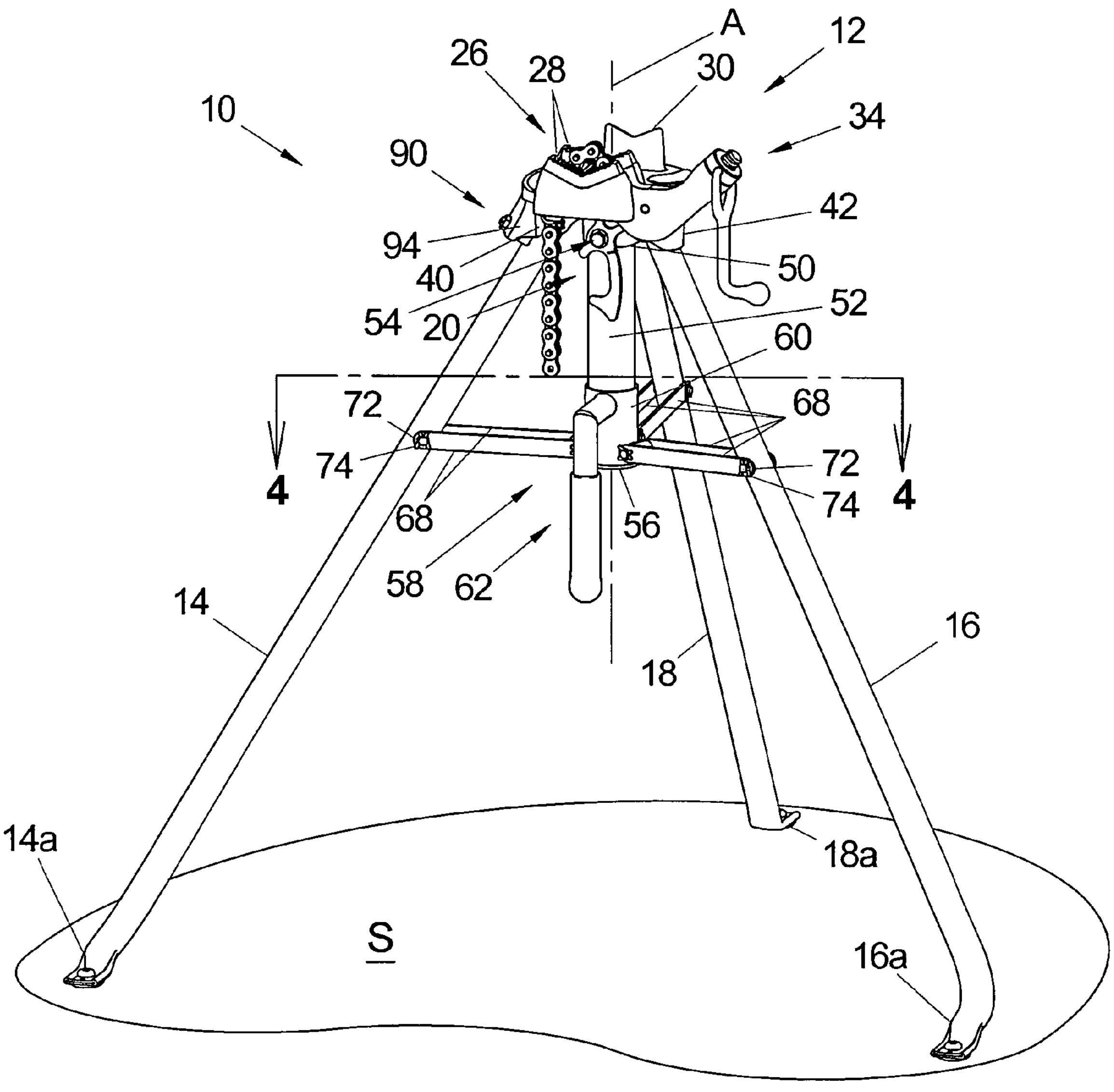
FIG. 1 is a perspective view of a work stand in accordance with the invention.

Referring now in greater detail to the drawings, wherein the showing are for the purpose of illustrating a preferred embodiment of the invention only, and not for the purpose of limiting the invention, a stand 10 in accordance with the present invention comprises a base 12, a pair of front legs 14 and 16, and a rear leg 18, which legs are tubular and are pivotally mounted on base 12 as set forth more fully hereinafter for displacement between extended and retracted or folded positions relative to base 12. In the extended position of the legs, as shown in FIG. 1, the stand is adapted to be supported on an underlying surface S for use. As set forth more fully hereinafter, when the legs are in the retracted positions thereof they are adapted to be captured by a latch mechanism 20 on the stand to facilitate transportation and storage thereof.

Figure 2:
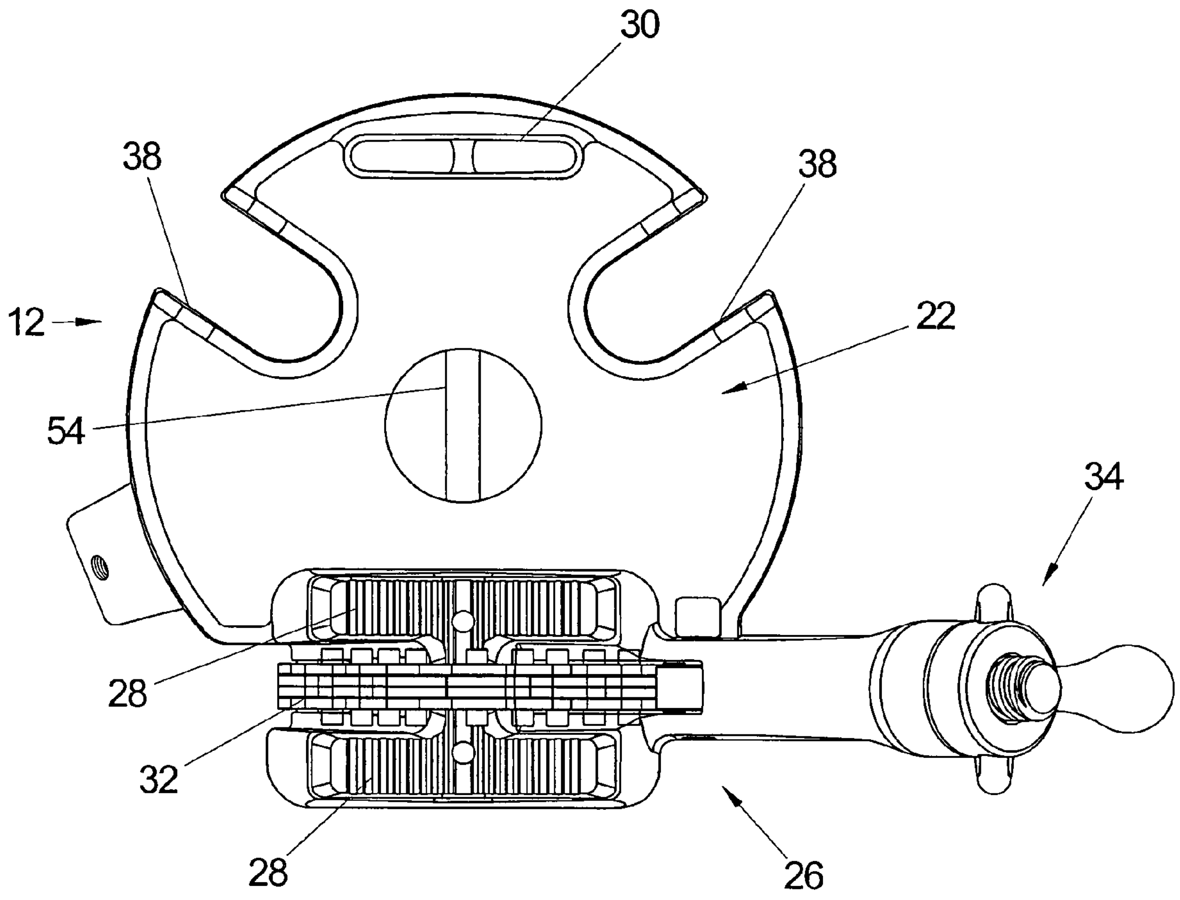
FIG. 2 is a plan view of the base component of the stand.
Figure 3:
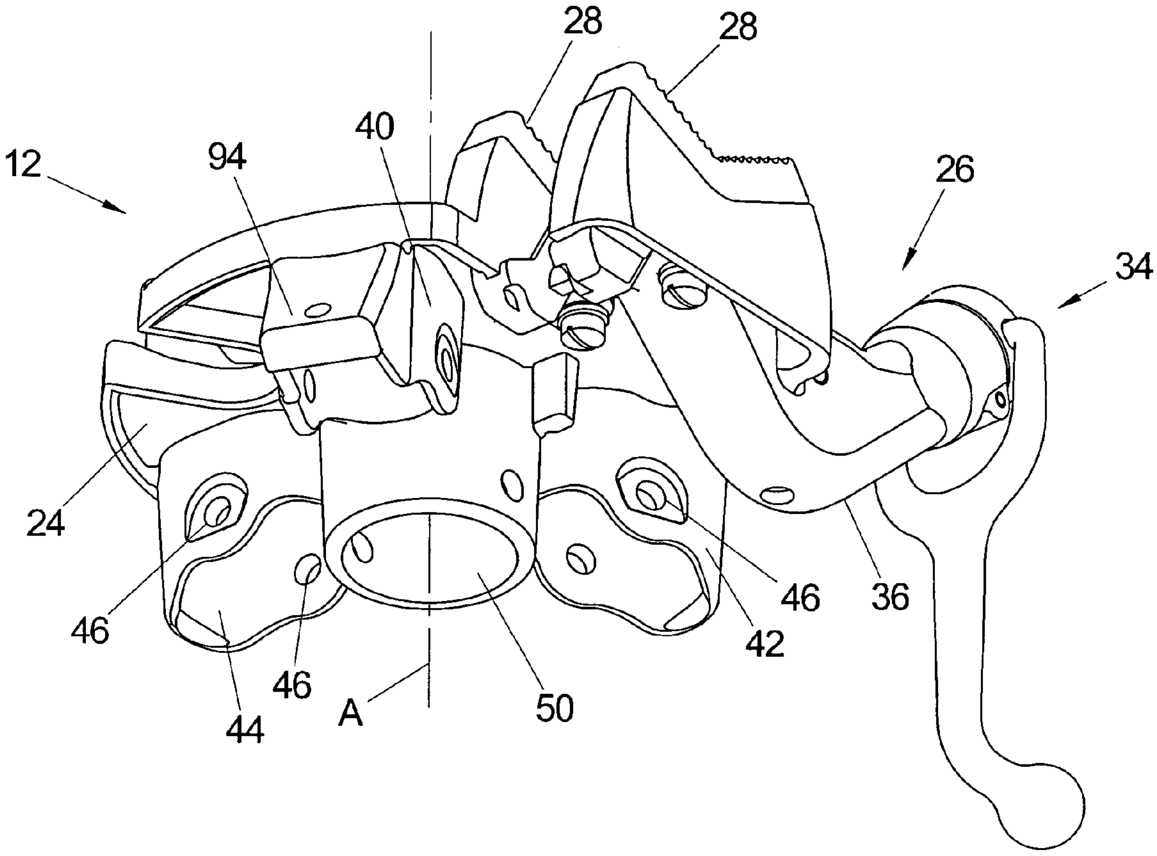
FIG. 3 is a perspective view of the underside of the base component.

As best seen in FIGS. 2 and 3 of the drawing, base 12 is preferably a unitary iron casting having top and bottom sides 22 and 24, respectively. The front end of top side 22 is configured to provide a chain vise 26 including V-shaped cradle portions which receive correspondingly contoured V-shaped serrated jaw components 28 which are integral with one another and suitably mounted on the cradle portions. The rear end of base 12 is provided with a V-shaped cradle 30 which is cooperable with the chain vise jaws to support a pipe to be worked on. The chain vise, in a well known manner, includes a chain 32 adapted to extend across a pipe resting on the cradle components and to be tightened thereabout by a handle operated screw mechanism 34 in arm 36 of the base and to which one end of the chain is attached. Base 12 is further provided about the periphery thereof with a pair of radially deep U-shaped slots or recesses 38 between the top and bottom sides which, for the convenience of the user, facilitate supporting tools such as pipe wrenches, cutters and the like from the base during use thereof.

Bottom side 24 of the base is provided with three circumferentially spaced apart leg sockets 40, 42 and 44 to which legs 14, 16 and 18 are pivotally secured, respectively. More particularly in this respect, as will be appreciated from FIGS. 1, 3 and 5, each of the sockets is provided with a pair of pin openings 46 and the upper end of the corresponding leg is received in the socket and pivotally interconnected therewith and thus with base 12 by a corresponding nut and bolt assembly 48. Base 12 further includes a circular sleeve 50 opening through top side 22 and extending downwardly from bottom side 24 and providing the base with an axis A. A support and guide tube 52 is attached to sleeve 50 by a nut and bolt assembly 54 and extends downwardly from the base coaxial with axis A. The lower end of tube 52 is provided with a radially outwardly extending flange 56 for the purpose set forth hereinafter. A tubular slide and handle assembly 58 is mounted on tube 52 and, in this respect, includes a tubular collar or slide component 60 displaceable upwardly and downwardly along tube 52 and an L-shaped handle 62 including a leg 64 attached to collar 60 such as by welding and extending radially outwardly therefrom, and a leg 66 extending downwardly from the outer end of leg 64 and parallel to axis A.

Figure 4:
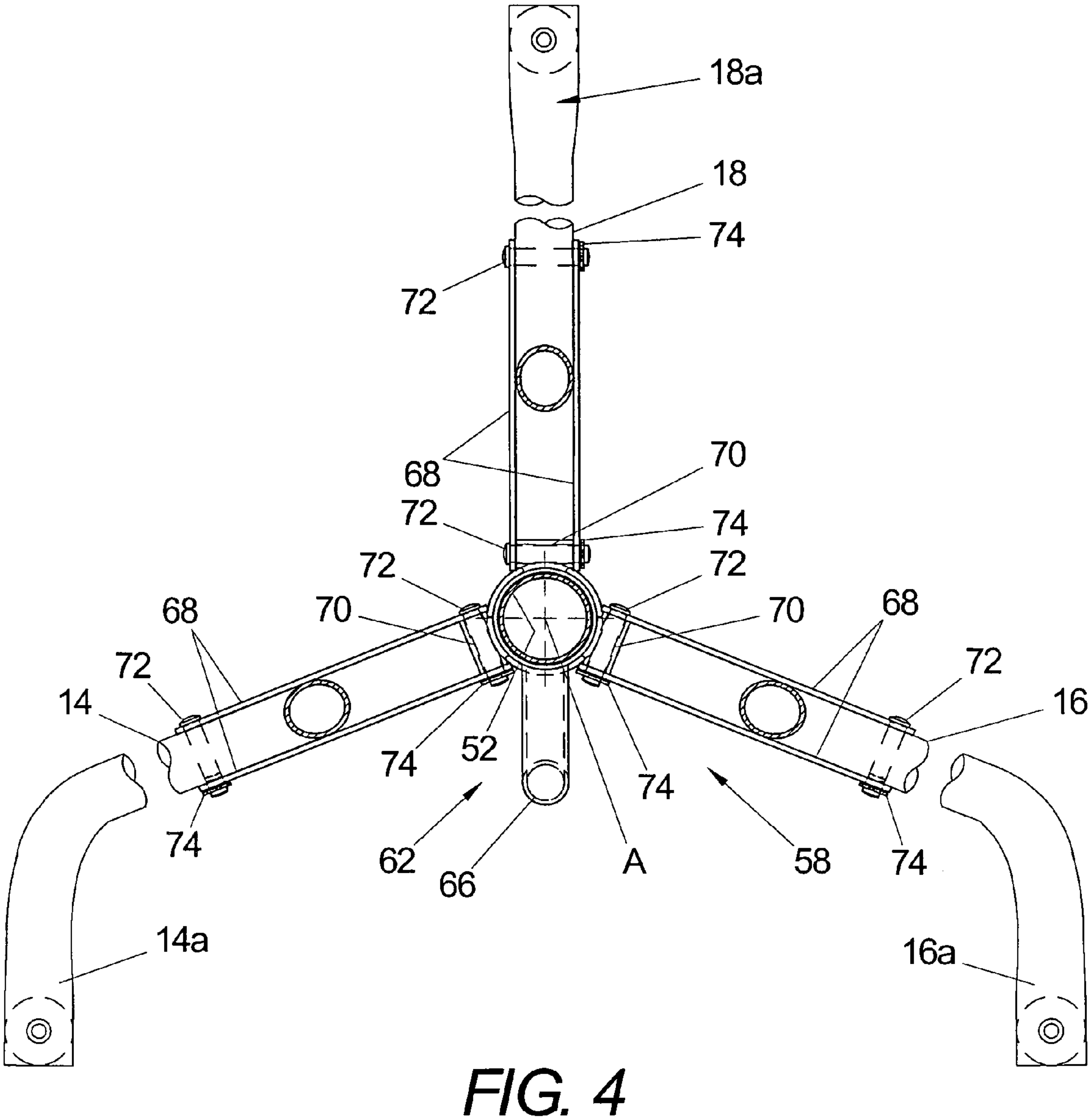
FIG. 4 is a plan view, in section, taken along line 4-4 in FIG. 1.

As best seen in FIGS. 1 and 4, legs 14, 16 and 18 are pivotally interconnected with slide component 60 by corresponding pairs of links 68. More particularly in this respect, slide component 60 is provided with a link mounting tube 70 for each of the legs and corresponding links, and the mounting tubes are suitably secured to the slide component such as by welding. Each pair of links 68 is pivotally interconnected with the corresponding mounting tube and leg by pin and spring clip assemblies including a pin 72 and spring clips 74. As will be appreciated from the position of the component parts of the stand in FIG. 1, when slide component 60 is at the lower end of guide tube 52, flange 56 at the lower end of the guide tube limits displacement of slide 60 downwardly along the tube. In this position of the slide, legs 14, 16 and 18 are in the extended positions thereof relative to axis A and tube 52, whereby the lower ends of the legs engage underlying surface S to support base 12 above the underlying surface and in a work position. As will be further appreciated from the foregoing description and FIG. 1, displacement of slide component 60 upwardly along tube 52 through the use of handle 62 displaces the inner ends of links 68 upwardly and thus draws legs 14, 16 and 18 inwardly to the retracted position thereof in which the legs are generally parallel to axis A and tube 52 to facilitate transportation and storage of the stand.

In accordance with one aspect of the invention, and as is shown in FIG. 1, the lower ends **14*a* and 16*a* of front legs 14 and 16 of the stand extend forwardly and parallel to one another when the legs are in the extended positions thereof and the stand is erected so as to provide feet by which the stand is supported on underlying surface S. This configuration of the feet or lower ends of the front legs increases the stability of the stand against tipping forwardly when a pipe or the like is supported on the stand and/or is being worked upon. More particularly in this respect, all three legs of such stands heretofore available have had the bottom ends or feet of each leg extending radially outwardly of axis A in the same direction as the axis of the leg, as is shown for rear leg 18 in FIG. 4. In contrast, as will be appreciated from FIG. 4, the lower ends 14*a* and 16*a*** of the front legs extend at an angle to the axis of the corresponding leg.

Figure 5:
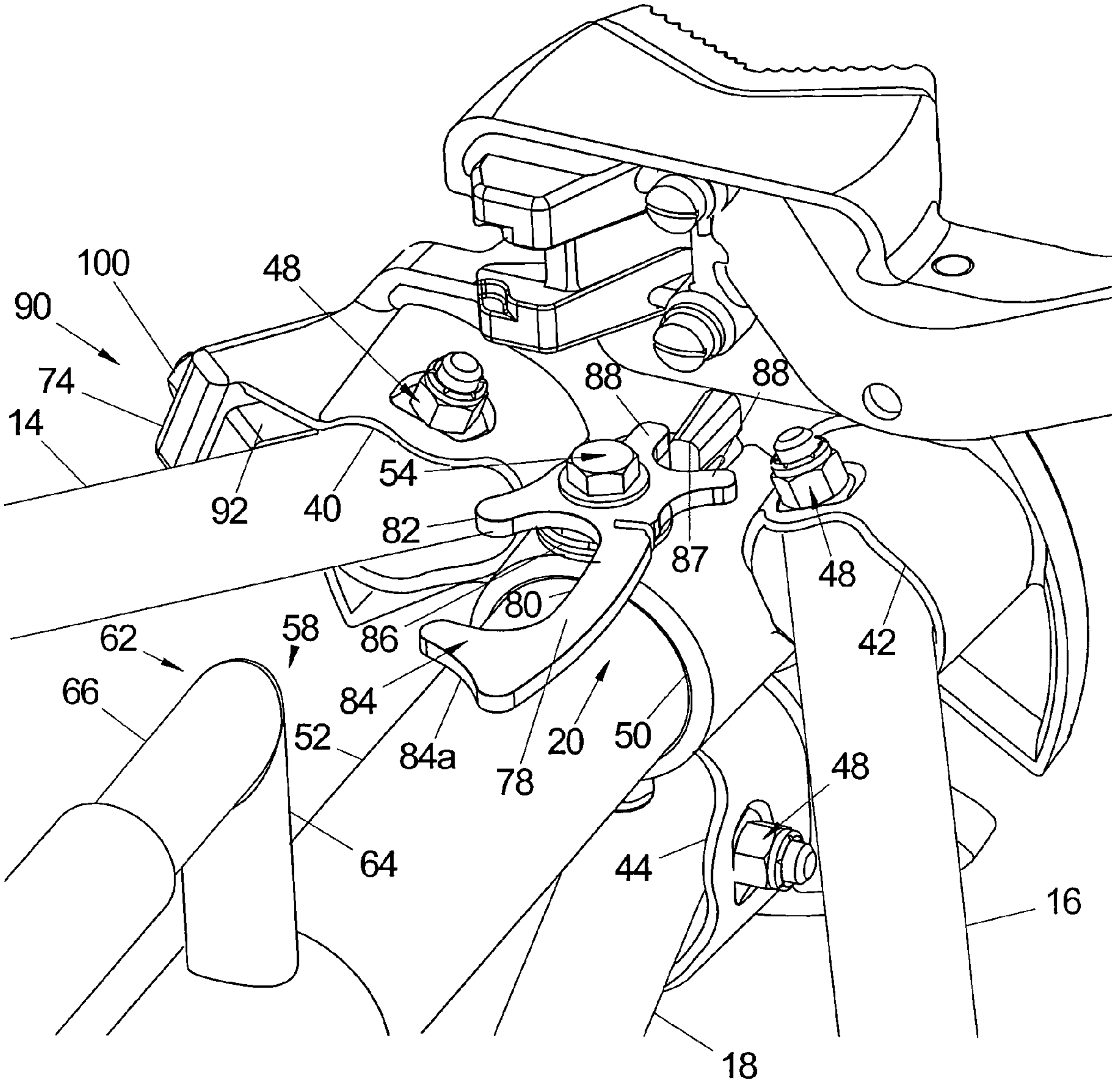
FIG. 5 is an enlarged perspective view of the latch and leg clamp components and showing the clamp component of the stand in the unlatched position; and, FIG. 6 is an enlarged perspective view similar to FIG. 5 and showing the latch in the latched position.
Figure 6:
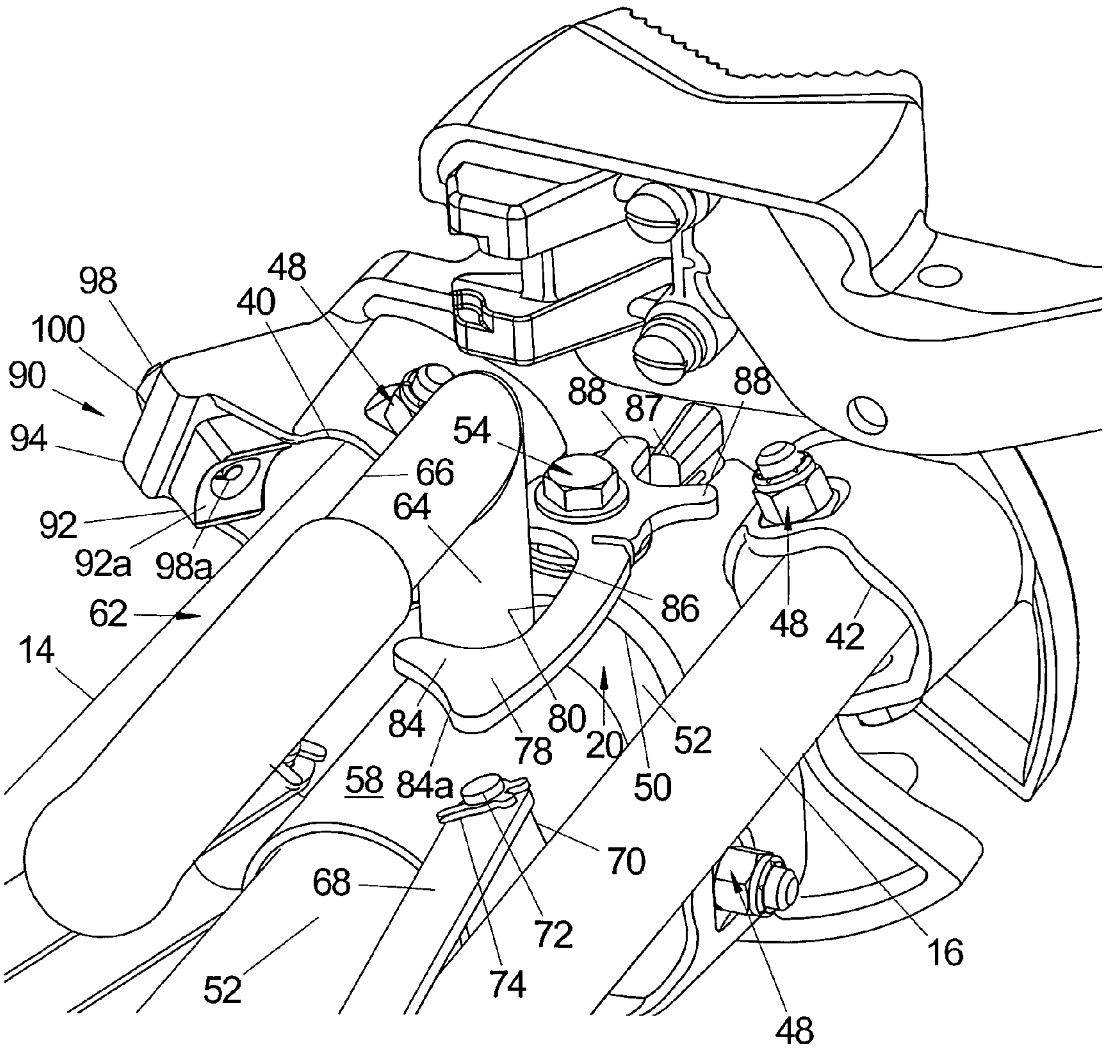

In accordance with yet another aspect of the invention, as best seen in FIGS. 5 and 6, latch mechanism 20 is adapted to automatically interengage with handle 62 of the stand when the legs are in the retracted positions thereof, thus to releasably hold the legs in the latter position to further facilitate transportation and storage of the stand in the collapsed position thereof. More particularly, latch mechanism 20 includes a latch member 78 pivotally mounted on sleeve 50 of base 12 by the nut and bolt assembly 54 by which support and guide tube 52 is mounted on the base. The latch includes a C-shaped recess 80 below the pivot axis defined by the nut and bolt assembly, and the recess is defined in part by a downwardly extending retaining finger 82 adjacent the pivot axis and an inwardly extending cam portion 84 at the lower end of the recess. A torsion spring 86 interengages latch member 78 and a stop component 87 extending downwardly from the bottom side of base 12 to bias the latch member clockwise in FIGS. 5 and 6. As slide component 60 is moved upwardly along guide tube 52 from the position shown in FIG. 1 of the drawings, leg 64 of the handle engages cam surface **84*a* of cam portion 84 to pivot the latch member counterclockwise against the bias of spring 86. When leg 64 of the handle passes cam portion 84, the spring biases the latch member clockwise to engage the handle portion and thus slide component 60 in the latched position as shown in FIG. 6 and in which the legs of the stand are generally parallel to axis A and slide tube 52. The upper end of latch member 78 includes fingers 88 which are spaced apart to receive stop component 87 therebetween and which engage the latter to limit pivotal displacement of the latch in the latching and unlatching directions. Cam portion 84 provides for manually displacing the latch against the bias of spring 86 to the unlatched position releasing the handle and slide assembly for displacement downwardly along tube 52** to displace the legs to the extended positions thereof in which the stand is erected.

In accordance with yet another aspect of the invention, as shown in FIGS. 1, 5 and 6, leg 14 of the stand is provided with an adjusting shoe arrangement 90 for increasing the stability of the stand in the erected position thereof by removing free-play between the parts resulting from wear, cumulative manufacturing tolerances, and the like. In the embodiment illustrated, the shoe arrangement includes a shoe element 92 adjustably mounted on a shoe support block 94 which is integral with and extends outwardly from socket 40 for leg 14. Shoe element 92 has an arcuate interface 92*a* engaging against the outer surface of leg 14 and includes a threaded stem 98 threaded by interengaging with an opening therefor in block 94. The outer end of stem 98 is adapted to be rotated through the use of an appropriate tool and, in the embodiment illustrated, includes a hex head 100 for rotation by a wrench or the like. The inner end 98*a* of stem 98 is interengaged with shoe 92 for rotation relative thereto whereby, as will be appreciated from FIGS. 5 and 6, rotation of stem 98 in opposite directions displaces shoe 92 toward and away from leg 14. When the stand is erected, leg 14 engages against the inner side of the shoe to minimize or eliminate free-play between the upper ends of the legs and base 12, and between the legs and links and such free-play is progressively reduced by adjusting stem 98 for shoe 92 to increasingly apply force to the leg.

While considerable emphasis has been placed herein on the structures and structural interrelationships between the component parts of a preferred embodiment of the invention, it will be appreciated that other embodiments can be made and that many changes can be made in the preferred embodiment without departing from the principals of the invention. Accordingly, it is to be distinctly understood that the foregoing descriptive matter is to be interpreted merely as illustrative of the invention, and not as a limitation, and that it is intended to include all embodiments and modifications of the preferred embodiments insofar as they come within the scope of the appended claims or the equivalents thereof.

Having thus described the invention, it is so claimed:

1. A work stand comprising a base having top and bottom sides and a support member extending downwardly from said bottom side, three legs spaced apart about said support member and having upper ends pivotally attached to said base and lower ends below said support member for engaging an underlying surface to support said base above said surface, a collar slidable on said support member between upper and lower positions relative to said base, and links between said collar and said legs for displacing said legs between extended and retracted positions relative to said support member, said collar being in said upper and lower positions when said legs are in said retracted and extended positions, respectively, and a handle on said collar for displacing said collar to displace said legs between the extended and retracted positions thereof and for carrying said stand in the retracted position of said legs, further including a latch on said collar and said base and a keeper on the other interengaging in said retracted position of said legs to releasably hold the legs in the retracted position.

2. A stand according to claim 1, wherein said keeper is on said handle and said latch is on said base.

3. A stand according to claim 1, and at least one opening in said base between said top and bottom sides for removably supporting a tool on said base.

4. A stand according to claim 3, wherein said base has a periphery, and said at least one opening includes a recess in said periphery between said top and bottom sides.

5. A stand according to claim 1, further including a shoe adjustably mounted on said base for applying a force on one of said legs in the extended position of said legs and in the direction of pivotal displacement of the one leg.

6. A stand according to claim 5, wherein said one leg is pivotally mounted on said base by a pivot pin and said shoe is on a shoe support mounted on said base for displacement transverse to said pivot pin.

7. A stand according to claim 6, wherein said shoe support is spaced outwardly of said one leg and said shoe is between said shoe support and said one leg and is displaceable relative to said shoe support inwardly and outwardly of said one leg.

8. A stand according to claim 7, wherein said shoe includes an adjusting screw threadedly interengaged with said shoe support and a shoe element interconnected with said adjusting screw for rotation relative thereto.

9. A stand according to claim 1, wherein said handle is L-shaped and includes a first leg extending outwardly of said collar and a second leg parallel to said support member.

10. A stand according to claim 9, further including a latch pivotally mounted on said base and engaging with said first leg of said handle to releasably hold said legs in the retracted position.

11. A stand according to claim 10, wherein said latch is pivotal between latched and unlatched positions relative to said first leg, and a spring biasing said latch toward the latched position.

12. A stand according to claim 1, further including a latch on one of said collar and said base and a keeper on the other interengaging in said retracted position of said legs to releasably hold the legs in the retracted position and further including a shoe adjustably mounted on said base for applying a force on one of said legs in the extended position of said legs and in the direction of pivotal displacement of the one leg.

13. A stand according to claim 12, and at least one opening in said base between said top and bottom sides for removably supporting a tool on said base.

14. A stand according to claim 12, wherein said handle is L-shaped and includes a first leg extending outwardly of said collar and a second leg parallel to said support member.

15. A stand according to claim 14, wherein said latch is on said base and said keeper includes said first leg of said handle.

16. A stand according to claim 15, wherein said latch is pivotal between latched and unlatched positions relative to said first leg, and a spring biasing said latch toward the latched position.

17. A stand according to claim 16, wherein said one leg is pivotally mounted on said base by a pivot pin and said shoe is on a shoe support mounted on said base for displacement transverse to said pivot pin and wherein said shoe support is spaced outwardly of said one leg and said shoe is between said shoe support and said one leg and is displaceable relative to said shoe support inwardly and outwardly of said one leg.

18. A stand according to claim 17, wherein said base has a periphery, and at least one U-shaped recess extending inwardly from said periphery to support a tool in suspension from said base.

19. A stand according to claim 18, wherein said shoe includes an adjusting screw threadedly interengaged with said shoe support and a shoe element interconnected with said adjusting screw for rotation relative thereto.

* * * * *